United States Patent
Khanduja et al.

(10) Patent No.: US 9,128,943 B1
(45) Date of Patent: Sep. 8, 2015

(54) METHOD AND SYSTEM FOR TRACKING RE-SIZING AND RE-CREATION OF VOLUMES CREATED FOR MAKING INCREMENTAL BACKUPS

(75) Inventors: Vaibhav Khanduja, Bangalore (IN); Shankar Balasubramanian, Bangalore (IN); Sureshbabu Murugesan, Krishnagiri (IN)

(73) Assignee: EMC CORPORATION, Hopkinton, MA (US)

( * ) Notice: Subject to any disclaimer, the term of this patent is extended or adjusted under 35 U.S.C. 154(b) by 98 days.

(21) Appl. No.: 13/248,223

(22) Filed: Sep. 29, 2011

(51) Int. Cl.
*G06F 17/30* (2006.01)

(52) U.S. Cl.
CPC .............. *G06F 17/30091* (2013.01)

(58) Field of Classification Search
CPC .................................................. G06F 17/30091
USPC .......................................... 707/646, 999.204
See application file for complete search history.

(56) References Cited

U.S. PATENT DOCUMENTS

| | | | |
|---|---|---|---|
| 7,424,592 B1* | 9/2008 | Karr et al. ..................... | 711/203 |
| 2009/0300080 A1* | 12/2009 | Stringham ..................... | 707/204 |
| 2011/0088027 A1* | 4/2011 | Jelvis et al. ..................... | 717/174 |
| 2011/0154473 A1* | 6/2011 | Anderson et al. ............... | 726/11 |
| 2011/0246731 A1* | 10/2011 | Ninose et al. ................. | 711/162 |

* cited by examiner

*Primary Examiner* — Alexey Shmatov
(74) *Attorney, Agent, or Firm* — Dergosits & Noah LLP; Todd A. Noah

(57) ABSTRACT

A method for tracking resizing and recreation of volumes in a block-based snapshot backup program. In an embodiment, a record ID is associated with a major and minor number assigned to each volume to be backed up. The record ID maintains a unique reference to the bitmap corresponding to a backed up volume in case the minor number is reused by the volume manager driver during a recreate operation. The length of the volume to be maintained is maintained and compared to the length of the to track any resizing of the volume by the volume manager. In the event of any resizing or recreation, the original bitmap can be replaced with an updated bitmap to ensure proper backup of the resized or recreated volumes.

20 Claims, 5 Drawing Sheets

| MINOR NUMBER | BITMAP | RECORD ID NUMBER |
| --- | --- | --- |
| 1010 | BM1 | 1.0 |
| 1011 | BM2 | 2.0 |
| ⋮ | ⋮ | ⋮ |
| 1111 | BM6 | 6.0 |

FIG. 3

METHOD AND SYSTEM FOR TRACKING RE-SIZING AND RE-CREATION OF VOLUMES CREATED FOR MAKING INCREMENTAL BACKUPS

BACKGROUND

In computer storage, a volume management scheme provides a method of allocating space on mass-storage devices that is more flexible than conventional partitioning schemes. In particular, a volume manager can concatenate, stripe together or otherwise combine partitions into larger virtual units that administrators can re-size or recreate, potentially without interrupting system use. Supporting backups for a high-density file system using traditional mechanism of walking through the files and collecting information can often be very slow. Snapshot techniques, such as the Networker SnapImage Module solve this problem by taking snapshot images of the file system to perform live backups at the block level. Unlike disk-level backup systems, resizing or recreating a volume requires block-level snapshot programs like SnapImage to track and accommodate any resizing or recreation of blocks to ensure proper backup operation.

Backup applications supporting block-level incremental backup are built upon tracking writes onto volumes. The UNIX volume manager creates volume devices conforming to standards making a block and or character device for each volume it creates. Each block/character device is represented using a major and minor number. To track writes to the volume, the snapshot program creates a bitmap indexed using major and minor number of the volume device. The length of the bitmap is directly proportional to the size of volume. The change in size of volume needs to be tracked so that the bitmap can be adjusted accordingly. Volume manager programs usually provide a user interface that allows deletion and re-creation of the same volume. Administrators may re-create volumes for number of reasons, such as changing the disk layout from concatenated to striped, or vice versa. Re-creation or re-sizing of a volume may result in a new pseudo volume device with a minor number that may have been previously used. Any such repetition must be tracked and reported to the snapshot backup application so that the bitmap created for that volume can be flushed or recreated. If any repetition of the major/minor number is not tracked, the snapshot program may perform an incomplete or incorrect backup.

In present backup systems, the change in length or recreation of a volume is not tracked as the bitmap created within most snapshot programs tracks writes on the low level disk. Thus, present backup systems fail to accommodate challenges posed by resizing or recreation of blocks at the block-level.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 3 is a table that illustrates an example association of unique record ID numbers with specific bitmaps and minor numbers;

DETAILED DESCRIPTION

The subject matter presented herein provides for backups that operate at the volume layer and utilizes the pseudo device layer that exists between the file system layer and the device layer. The Veritas volume manager (VxVM) driver defines a minor number that indexes a specific bitmap stored during a snapshot backup operation. Re-creation or re-sizing a volume can lead to re-use of a previously used minor number, thus resulting in the referencing of an incorrect bitmap or deletion of a valid bitmap. Embodiments of a snapshot program make use of a record ID number that is generated by the VxVM driver. The record ID number is used as an additional index to correlate specific minor numbers and bitmaps. During backup operations, a process checks the record ID number to ensure that a previously used minor number is not reused to ensure that the corresponding bitmap remains uncorrupted. For non VxVM systems that do not automatically generate a record ID number, the process can include a function to create a record number, such as from a timestamp, that will form an additional index to the minor number to bitmap correlation.

Embodiments are directed to a system and method for tracking resizing and recreation of volumes in a block-based snapshot backup program. In an embodiment, a record ID is associated with a major and minor number assigned to each volume to be backed up. The record ID maintains a unique reference to the bitmap corresponding to a backed up volume in case the minor number is reused by the volume manager driver during a recreate operation. The length of the volume to be maintained is maintained and compared to the length of the bitmap to track any resizing of the volume by the volume manager. In the event of any resizing or recreation, the original bitmap can be modified or replaced with an updated bitmap to ensure proper backup of the resized or recreated volumes.

Figure 1:
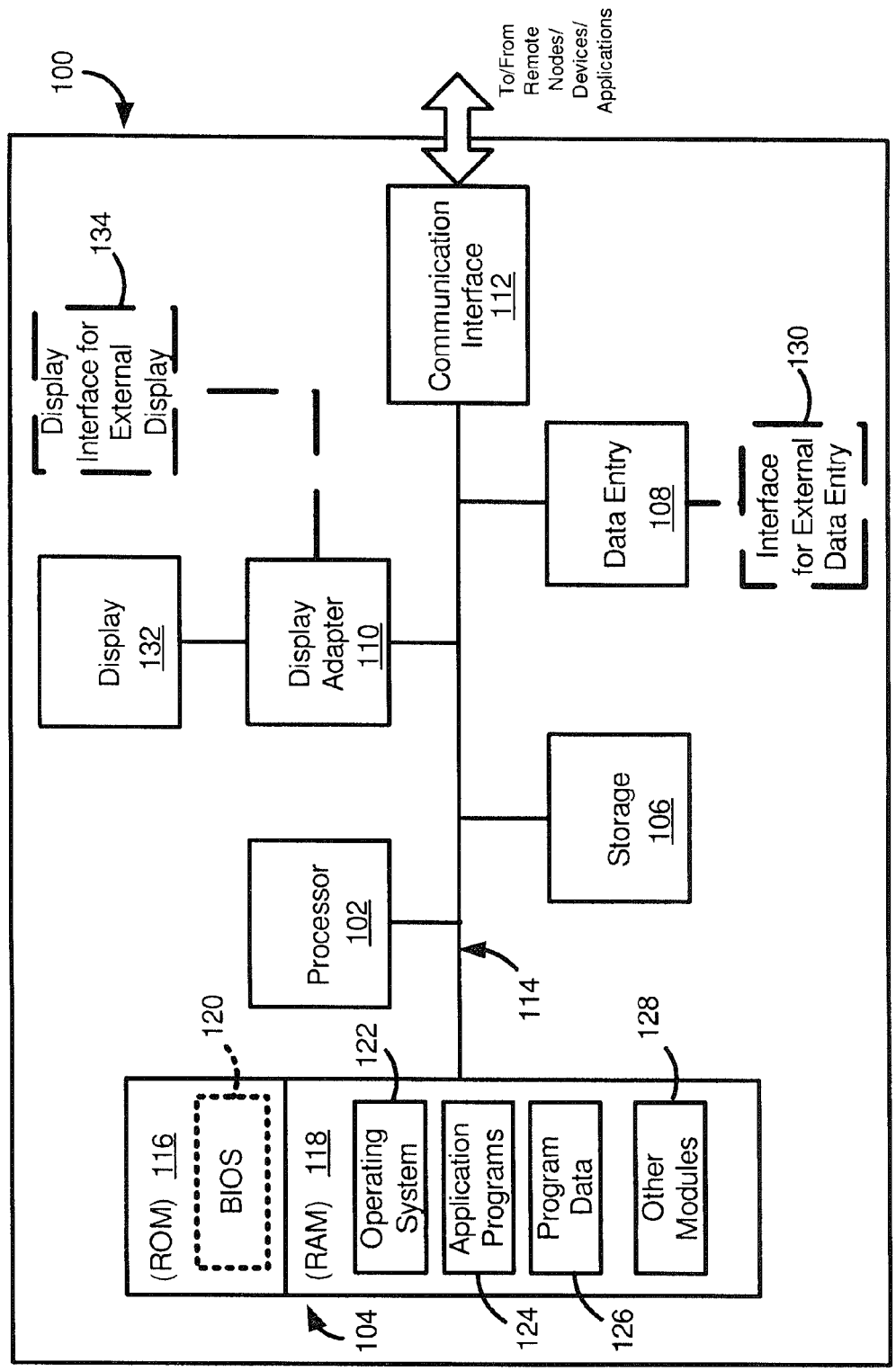
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

In an embodiment, system 100 of FIG. 1 represents a Unix-based system, in which there are two general kinds of device files, known as character (char) special files and block special files. Character files relate to devices through which the system transmits data one character at a time. These device nodes often implement streaming communication with devices such as mice, keyboards, terminal, and so on. Block files correspond to devices through which the system moves data in the form of blocks. These device nodes often represent addressable devices such as memory, hard disks, CD-ROM drives, and so on, that support random access and seeking. Device nodes on Unix-based systems do not necessarily have to correspond to physical. Nodes that lack this correspondence form the group of pseudo-devices. Most file systems are based on a block device, and block storage is normally abstracted by a file system or database management system for use by applications and end users. In backup systems, block storage is typically handled by logical volume management (LVM) system.

Figure 2:
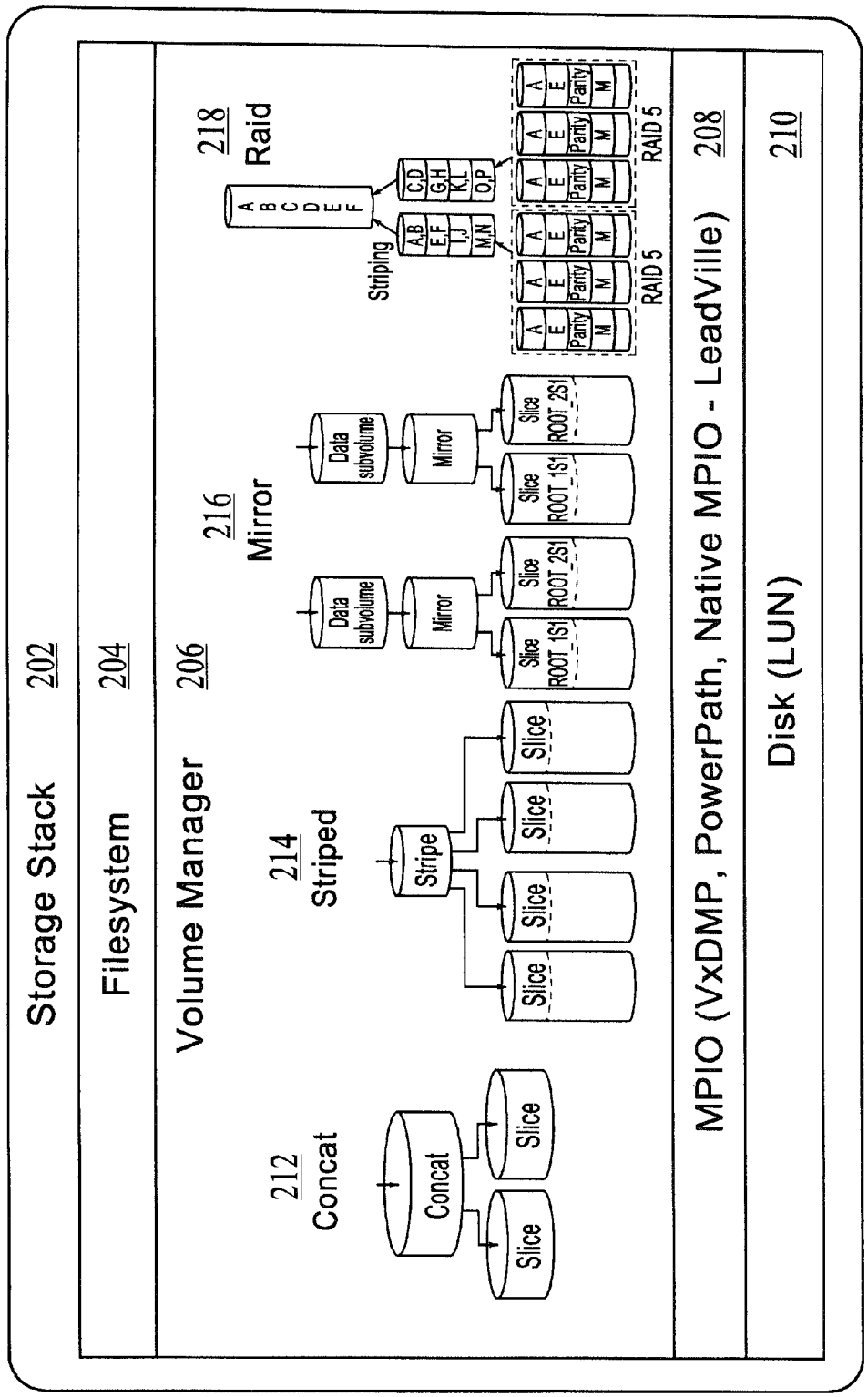
FIG. 2 is a block diagram illustrating an example storage system environment for performing pseudo-disk backups according to an embodiment.

FIG. 2 illustrates a storage stack production environment 202 that may be used with embodiments. The arrangement of components in FIG. 2 may be implemented by some or all of the components of the hardware device 100 of FIG. 1. The top-level of storage stack system 202 is the file system 204. The file system 204 serves to organize the data that is retained after a program using the data terminates. It provides procedures to store, retrieve, and update the data, and manages the available space on the storage devices that store the data. Various different file systems may be provided by different software vendors, and snapshot programs are configured to support particular file systems. For example, the SnapImage program supports VxFS (Veritas file system) and UFS (Unix file system). Below the filesystem layer 204 is the volume manager 206, which could be VxVM, HPLVM or Solaris LVM (logical volume manager). The volume manager 204 implements a form of storage virtualization. The volume manager map physical volumes or "physical extents" (e.g., hard disk partitions or logical unit numbers) of an external storage device to logical extents. These logical extents can then be manipulated in flexible ways depending on the types of disk organizations implemented in the system. For the embodiment of FIG. 2, the volume manager 206 supports concatenated (concat) 212, striped 214, mirror 216, and RAID-based 218 disk organizations.

Volume managers, such as VxVM typically provide both volume management and multi-path input/output (I/O) functionalities. Thus, as shown in FIG. 2, the volume manager layer 206 interfaces with a multipath I/O (MPIO) layer 208. The MPIO layer 208 provides a plurality of physical paths between the processor in the system and the mass storage devices through the interface components (e.g., bus, switches, etc.) to provide redundancy, fault-tolerance and enhanced performance. In an embodiment, the MPIO layer 208 of FIG. 2 may be an MPIO that is compatible with particular volume manager 206. For example, for a Veritas volume manager, the MPIO may be the Symantec Dynamic Multipathing (DMP) component, or the PowerPath™ component provided by EMC, or any other commercially available or native MPIO component. The MPIO layer 208 provides the interface to the physical storage device 210, such as a disk that is accessed through a unique LUN.

Embodiments of the volume manager component of FIG. 2 implement a snapshot backup program, such as the SnapImage program. SnapImage reduces the strain on server performance through block-level image backup. SnapImage takes a filesystem snapshot, builds a block list, and then backs up the data through the server as virtually one large file. Although embodiments may be directed to backup systems that include a SnapImage program, it should be noted that any similar snapshot program may be used, and the term "snapshot program" is intended to cover the SnapImage program or any similar volume or block-based backup program.

In general, the snapshot file system is an exact copy of the original file system as it is made at the time of the snapshot operation. A snapshot file system is read-only and exists only as long as it and the file system that has been snapped are mounted. A snapshot file system consists of a super-block, a bitmap, a blockmap, and data blocks copied from the snapped file system. The super-block is similar to the super-block of a normal VxFS file system, and is followed by a bitmap contains one bit for every block on the snapped file system. Bitmap entries are initially set to zero and a set bit in the bitmap indicates that the appropriate block was copied from the snapped file system to the snapshot. The blockmap contains one entry for each block on the snapped file system. When a block is copied from the snapped file system to the snapshot, the appropriate entry in the blockmap is changed to contain the block number on the snapshot file system that holds the data from the snapped file system. The data blocks used by the snapshot file system are filled by any data copied from the snapped file system.

After a snapshot file system is created, the bitmap, blockmap and super-block are initialized and the currently mounted file system is then frozen. The snapshot file system initially satisfies read requests by simply finding the data on the snapped file system and returning it to the requesting process. When an update or a write changes the data in a block of the snapped file system, the old data is first read and copied to the snapshot before the snapped file system is updated. The bitmap entry for that block is changed from 0 to 1 to indicate that the data for the block can be found on the snapped file system. The blockmap entry for the block is changed to the block number on the snapshot file system containing the old data. A subsequent read request for the block on the snapshot file system is satisfied by checking the bitmap entry for the block and reading the data from the indicated block on the snapshot file system, rather than from the block on the snapped file system. As data blocks are changed on the snapped file system, the snapshot will gradually fill with data copied from the snapped file system.

Certain use cases can impose challenges on the accuracy of the snapshot file system in a block-based system. For example, recreating or resizing data volumes for underlying sliced partitions may pose problems when using the underlying major/minor number structure of the Veritas volume manager. In general, the disk size cannot be changed since it is set by the system parameters (e.g., RAID size, etc.). The length of the bitmap corresponds to the length of the physical disk. The size of the volumes, however can usually be changed through appropriate graphical user interface mechanisms. Furthermore, volumes can be deleted or recreated by the user. To ensure proper operation of the snapshot program, any changes to the size of a volume (resizing), and any deletion or recreation of a volume must be tracked.

For an embodiment in which the volume manager 206 of storage stack system 202 is the Veritas volume manager VxVM, a pseudo device of the volume is created by the volume manager layer. UNIX as an operating system mandates that each pseudo device be given a unique number called a minor device number. This minor device number is unique for a particular type of device. Each type of device is also uniquely identified by a major number. Thus, device nodes correspond to resources that the OS kernel has already allocated, and these resources are identified by a major number and a minor number. Generally, the major number identifies the device driver and the minor number identifies a particular device that the driver controls. In a VxVM system, the VxVM driver defines the minor numbers assigned to the volumes. For example, minor numbers may be assigned in the range of 0-64K and may start at any number. One issue that is associated with VxVM systems is that the minor numbers assigned to recreated, deleted, or resized volumes can be reused by the system. In this case, the bitmap associated with the original minor number by the snapshot program for an incremental backup will reference incorrect data if the minor number is reused in a subsequent snapshot.

During normal operation, the Veritas volume manager creates a pseudo device of the volume. Since the file system resides on these devices, the volume manager not only exposes a character device but also a block device for the volume. For systems that perform backups at the disk-level only, the reuse of minor numbers is generally not an issue. For systems that perform backups at the volume-level, however, the reuse of minor numbers associated with recreation of volumes is an issue.

In order to overcome the issue associated with reuse of minor numbers by the VxVM driver for recreated or deleted volumes, in an embodiment, the snapshot backup system associates another unique number known as "Record ID" or "RID" with each bitmap. In an embodiment, the RID is a unique floating point number, with an integer and fractional part. The recreating of a volume may result in same minor number but it always comes with unique record ID. The snapshot program associates its internal data structures with the major number, minor number, and unique RID. FIG. 3 is a table that illustrates an example association of unique record ID numbers with specific bitmaps and minor numbers. As shown in table 300, six example bitmaps 304 denoted BM1 to BM6 are created for certain snapshot backup operations. Corresponding minor numbers 302 from 1010 to 1111 are initially assigned to each of the respective bitmaps. In addition, a unique record ID number 306 is assigned to each minor number. Thus, for the example of FIG. 3, RID 1.0 is assigned to minor number 1010, RID 2.0 is assigned to minor number 1011, and so on. In the case that the VxVM driver reuses a particular minor number, the record ID number provides a unique identifier that preserves the assignment of the specific bitmap to the originally assigned minor number. During data access, the snapshot program checks against the RID number before accessing the bitmap for a volume for which backup is requested. In this way, the proper bitmap can be accessed even if the minor number has been reused by the VxVM driver.

In an embodiment, the record ID number 306 is a floating point number that is automatically generated by the VxVM driver upon initiation of a backup operation. The VxVM RID is then used by the snapshot system as the record ID number 306. For volume managers that do not automatically produce a record ID number (e.g., Solaris), the snapshot program driver may generate its own record ID number. In an embodiment, the record ID number is generated by a counter that generates a unique floating point number for every backup operation. Such a counter can be implemented through a time stamp component or a sequential counter, or similar component.

Along with deletion or recreation of volumes, the resizing of volumes can also cause inaccuracy of backups in volume-based systems. The VxVM driver provides an option to resize a previously created volume. The resizing of a volume may result in increasing or decreasing the size of file system residing on the volume. In an embodiment, the snapshot program provides a mechanism to track the write operations that occur on the changed size file system. The snapshot driver creates a bitmap for the disk and the length of the bitmap is based on the length of the volume. By discovering the length and comparing the length of the bitmap against the length of volume, the snapshot program can track the re-sizing of the volume.

Figure 4:
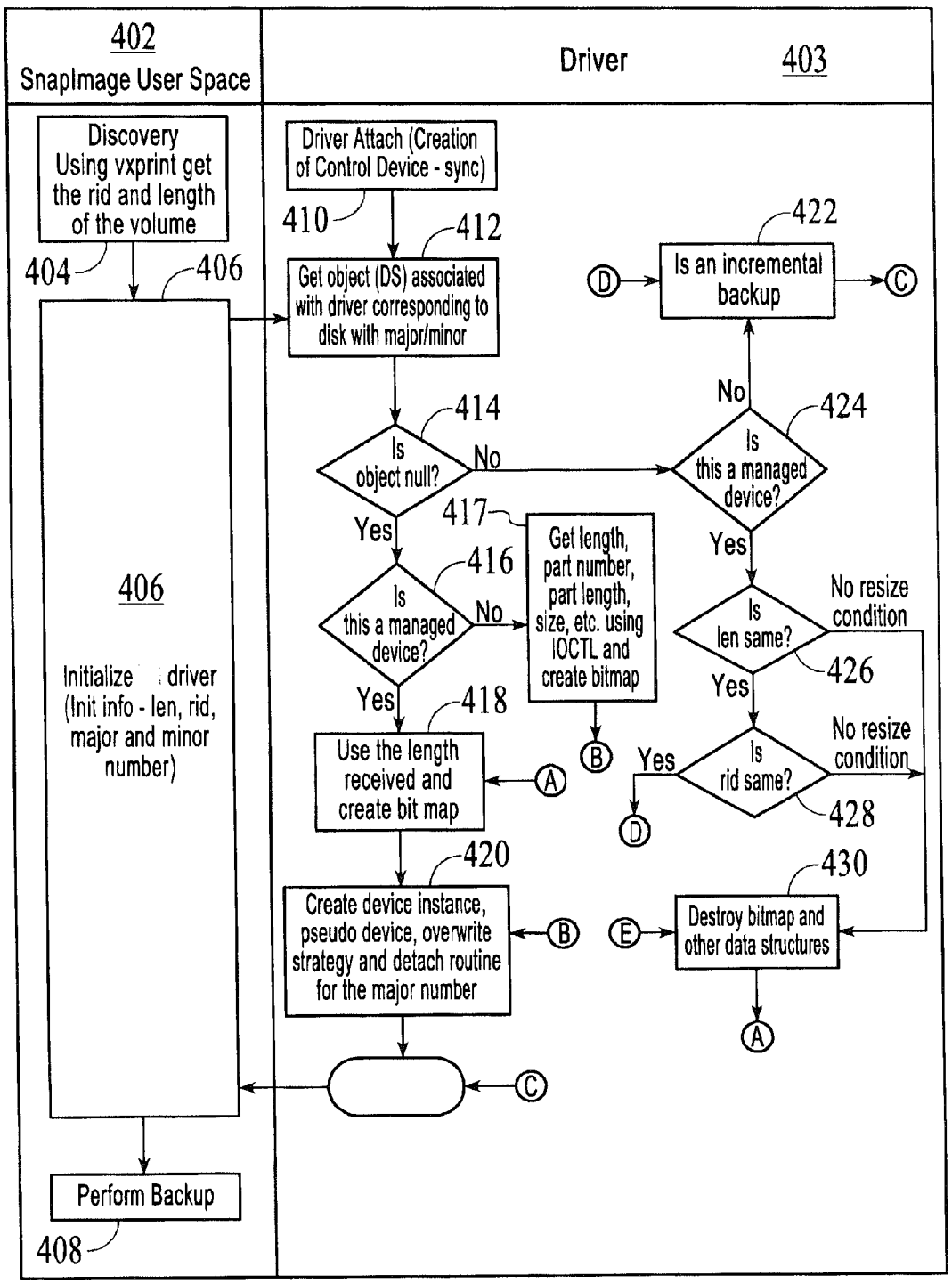
FIG. 4 is a flow diagram illustrating a method for tracking resizing and recreation of volumes using a snapshot program, under an embodiment.

FIG. 4 is a flow diagram illustrating a method for tracking resizing and recreation of volumes using a snapshot program, under an embodiment. Flowchart 400 generally illustrates a process of how events are triggered to tracking re-creation and resizing of volumes using record ID and length parameters in a snapshot driver. Flowchart 400 includes two process flows, one for the snapshot user space 402 and one for the driver component 403. The process flow for the snapshot user space 402 begins with a discovery phase 404 in which the record ID and length of the volume are obtained. The driver is then initialized in block 406. During this initialization phase, the driver is loaded with initialization information including the length of the volume, the record ID and the major and minor number of the volume. The driver then processes this information through its own flow process 403 to perform the backup operation, block 408.

For the embodiment of FIG. 4, the driver flow process 403 begins with a driver attach step 410. Upon initialization 406 of the attached driver by the snapshot user space, the driver gets the object associated with the driver corresponding to the disk identified by the major/minor number pair, block 412. In decision block 414, it is determined whether or not the object is null. If the object is null, the driver next determines if the device is a managed device, block 416. If it is a managed device, the driver uses the length received and creates a bit map, block 418. The driver then creates the device instance, the pseudo device, and overwrites the strategy and detaches the routine for the major number, block 420. At this point, the backup operation can be performed, block 408. In the case that the device is not a managed device, as determined in block 416, the driver gets the length, the part number, the part length, and so on, using an input/output control (IOCTL), which is a system call for device-specific operations and other operations which cannot be expressed by regular system calls, block 417. The process then proceeds from block 420 in which the device instance is created and the backup is performed.

If, in block 414 it is determined that the object is not null, the process again determines if the device is a managed device, block 424. If the object is not null and the device is managed, the backup is deemed to be in incremental backup, in which case, the backup operation is performed, block 408. If the object is not null and the device is managed, the driver then checks to see whether the length of the block is the same as shown in decision block 426. If the length is not the same, a resize condition exists in which case the bitmap and other data structures are destroyed, block 430 and the process proceeds from block 418 to create a bitmap using the length received during the initialization phase. If, in block 426 it is determined that the length is the same then the block has not been resized and the driver checks to see whether the record ID number is the same, block 428. If the RID is not the same, then a recreate condition exists in which case the bitmap and other data structures are destroyed, block 430 and the process proceeds from block 418 to create a bitmap using the length received during the initialization phase. If, in block 428 it is determined that the RID is the same, then the driver deems that the operation is an incremental backup and proceeds through block 422 to perform the backup, block 408.

In an embodiment, the record ID number is created automatically by the VxVM driver and is provided to the snapshot user space 402 through the discovery phase 404. This RID number is then passed to the driver through the get object process of block 412. Alternatively, the RID number may be a timestamp or counter value that is created by a separate process and not by the volume manager itself. In this case, it is generated and stored by this process and provided to the driver during the discovery and initialization phases.

Figure 5:
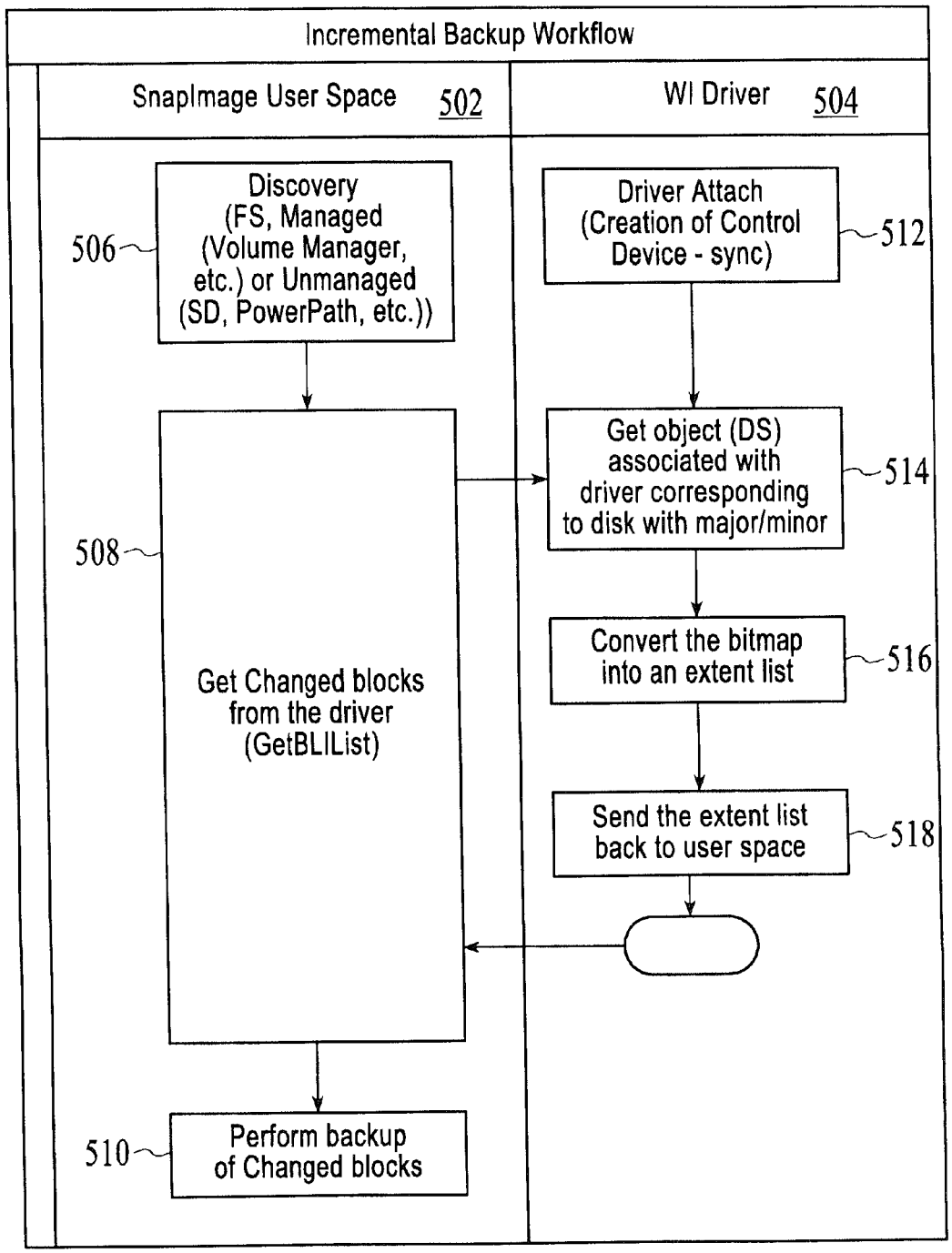
FIG. 5 is a flow diagram illustrating a method of performing an incremental backup using a snapshot program according to embodiments.

FIG. 5 is a flow diagram illustrating a method of performing an incremental backup using a snapshot program according to embodiments. Flowchart 500 includes two process flows, one for the snapshot user space 502 and one for the driver component 504. The process flow for the snapshot user space 502 begins with a discovery phase 506 in which the file system (FS), volume manager (VM) or unmanaged resources are discovered. The changed blocks from the driver are obtained in block 508 through operations performed by the driver in driver flow 504. After the changed blocks are obtained, the snapshot process performs the incremental backup by backing up the changed blocks, block 510.

For the embodiment of FIG. 5, the driver flow process 504 begins with a driver attach step 512. Upon initialization of the attached driver by the snapshot user space, the driver gets the object associated with the driver corresponding to the disk identified by the major/minor number pair, block 514. The driver then converts the obtained bitmap into an extent list, block 516. The extent list is then transmitted back to the user space 502, as shown in block 518, and the incremental backup based on the changed blocks is then performed, block 510.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method comprising:
    generating a unique record identifier for each of a plurality of minor numbers for a plurality of volumes of a storage element to be backed up in a snapshot file system, each of the plurality of minor numbers referencing one of a plurality of bitmaps for a volume, wherein each of the plurality of minor numbers is assignable to one or more of the plurality of volumes, and wherein each of the plurality of bitmaps contains a pattern indicating blocks backed up in the snapshot file system;
    associating each unique record identifier with the bitmap referenced by the corresponding minor number; and
    tracking changes to one of the plurality of volumes using at least one unique record identifier, a length of the bitmap corresponding to that unique record identifier, and a length of the volume.

2. The method of claim 1 wherein the unique record identifier is a floating point number comprising an integer and fractional portion, and wherein the unique record identifier is to be generated by a volume manager.

3. The method of claim 1 wherein the unique record identifier is a floating point number comprising an integer and fractional portion, and wherein the unique record identifier is to be generated by a counter using sequential numbering.

4. The method of claim 1 wherein the minor number is assigned by a volume manager.

5. The method of claim 4, wherein tracking the changes to one of the plurality of volumes using the at least one unique record identifier, the length of the bitmap corresponding to that unique record identifier, and the length of the volume comprises:

comparing the unique record identifier of the volume with the unique record identifier associated with the bitmap; and performing an incremental backup operation based on the unique record identifier of the volume matching the unique record number associated with the bitmap, or generating a new bitmap for the volume as recreated by the volume manager based on the unique record identifier of the volume not matching with the unique record identifier associated with the bitmap.

6. The method of claim 5, wherein performing the incremental backup operation comprises:

comparing the length of the volume with the length of the bitmap; and performing an incremental backup operation based on the length of the volume matching the length of the bitmap, or generating a new bitmap for the volume as recreated by the volume manager based on the length of the volume not matching the length of the bitmap.

7. The method of claim 6 wherein the volume corresponds to a managed device, and wherein the new bitmap is created using the length of the volume.

8. The method of claim 6 wherein the volume corresponds to a non-managed device, and wherein the new bitmap is created using an input/output control process.

9. The method of claim 1 wherein a first minor number referencing a first bitmap is similar to a second minor number referencing a second bitmap, wherein the second bitmap is different from the first bitmap, and wherein a first unique record number associated with the first bitmap is different from a second unique record number associated with the second bitmap.

10. A computer program product, comprising a non-transitory computer-readable medium having a computer-readable program code embodied therein, the computer-readable program code adapted to be executed by one or more processors to implement a method comprising:

generating a unique record identifier for each of a plurality of minor numbers for a plurality of volumes of a storage element to be backed up in a snapshot file system, each of the plurality of minor numbers referencing one of a plurality of bitmaps for a volume, wherein each of the plurality of minor numbers is assignable to one or more of the plurality of volumes, and wherein each of the plurality of bitmaps contains a pattern indicating blocks backed up in the snapshot file system;

associating each unique record identifier with the bitmap referenced by the corresponding minor number; and tracking changes to one of the plurality of volumes using at least one unique record identifier, a length of the bitmap corresponding to that unique record identifier, and a length of the volume.

11. The computer program product of claim 10 wherein the unique record identifier is a floating point number comprising an integer and fractional portion, and wherein the unique record identifier is generated by a volume manager or a counter using a sequential sequence.

12. The computer program product of claim 11 wherein tracking the changes to one of the plurality of volumes using the at least one unique record identifier, the length of the bitmap corresponding to that unique record identifier, and the length of the volume comprises:

comparing the unique record identifier of the volume with the unique record identifier associated with the bitmap; and performing an incremental backup operation based on the unique record identifier of the volume matching the unique record number associated with the bitmap, or generating a new bitmap for the volume as recreated by the volume manager based on the unique record identifier of the volume not matching the unique record identifier associated with the bitmap.

13. The computer program product of claim 10 wherein the minor number is assigned by a volume manager.

14. The computer program product of claim 13 wherein the computer-readable program code is further adapted to implement a method comprising:

comparing the length of the volume with the length of the bitmap; and performing an incremental backup operation based on the length of the volume matching the length of the bitmap, or generating a new bitmap for the volume as recreated by the volume manager based on the length of the volume not matching the length of the bitmap.

15. The computer program product of claim 14 wherein the volume corresponds to a managed device, and wherein the new bitmap is generated based on the length of the volume.

16. The computer program product of claim 14 wherein the volume corresponds to a non-managed device, and wherein the new bitmap is generated using an input/output control process.

17. A system comprising:

a processor; and memory configured to store one or more sequences of instructions which, when executed by the processor, cause the processor to carry out the steps of:

generating a unique record identifier for each of a plurality of minor numbers for a plurality of volumes of a storage element to be backed up in a snapshot file system, each of the plurality of minor numbers referencing one of a plurality of bitmaps for a volume, wherein each of the plurality of minor numbers is assignable to one or more of the plurality of volumes, and wherein each of the plurality of bitmaps contains a pattern indicating blocks backed up in the snapshot file system;

associating each unique record identifier with the bitmap referenced by the corresponding minor number; and tracking changes to one of the plurality of volumes using at least one unique record identifier, a length of the bitmap corresponding to that unique record identifier, and a length of the volume.

18. The system of claim 17 wherein the unique record identifier is a floating point number comprising an integer and fractional portion, and wherein the unique record identifier is generated by a volume manager upon a backup operation performed on the volume or a counter configured to assign a unique sequential number for each backup operation performed on the volume.

19. The system of claim 18 wherein the processor is further configured to carry out the steps of:

comparing the unique record identifier for the specific minor number with the unique record identifier for the corresponding bitmap; and performing an incremental backup operation based on the unique record identifier of the volume matching the unique record identifier associated with the bitmap, or creating a new bitmap for the volume as recreated by the volume manager based on the unique record identifier of the volume not matching the unique record identifier.

20. The system of claim 19 wherein the processor is further configured to carry out the steps of:

comparing the length of the volume with the length of the bitmap; and performing an incremental backup operation based on the length of the volume matching the length of the bitmap, or creating a new bitmap for the volume as recreated by the volume manager based on the length of the volume not matching the length of the bitmap.

* * * * *